United States Patent Office 2,744,120
Patented May 1, 1956

2,744,120

1-DEHYDROTESTOLOLACTONE

Josef Fried and Richard W. Thoma, New Brunswick, N. J., assignors to Olin Mathieson Chemical Corporation, New York, N. Y., a corporation of Virginia No Drawing. Application January 14, 1953,
Serial No. 331,333

1 Claim. (Cl. 260—343.2)

This invention relates to microbiological oxidation, and has for its object the provision of a process for oxidizing $C_{17}$-substituted steroids to obtain novel and useful derivatives.

Although $C_{17}$-substituted steroids have been subjected to microbiological oxidation prior to this invention, the microbiological oxidation of this invention is novel in affecting the substituent in the C–17 position of the cyclopentanophenanthrene nucleus, resulting in novel and useful derivatives.

More specifically, this invention includes subjecting $C_{17}$-substituted steroids to the action of fungi (or enzymes thereof) of the order Moniliales (Families: Moniliaceae, Dematiaceae, Stilbaceae, Tuberculariaceae), especially of the family Tuberculariaceae (Genera: Cylindrocarpon, Fusarium, Ramularia, etc.) and preferably of the genus Cylindrocarpon (species: *radicola, album, ianthothele*). Thus, it has been found that the fungus *Cylindrocarpon radicola* ATCC 11011 has a high order of activity in the microbiological oxidation of this invention. The novel derivatives obtained by the process of this invention are valuable hormones or intermediates therefor.

In the practice of this invention, the oxidation may be effected in a growing culture by either adding the $C_{17}$-substituted steroid to the culture during the incubation period, or by including it in the nutrient medium prior to inoculation. In any case, assimilable sources of nitrogenous materials (for growth-promotion) and carbon-containing materials (as energy source) should be present in the culture medium. Also, an adequate, sterile air supply should be maintained during the oxidation, e. g., by the conventional techniques of (1) exposing a large surface of the medium to air, or (2) submerged culture.

As the $C_{17}$-substituted steroid, any cyclopentanophenanthrene (or hydrogenated cyclopentanophenanthrene) having a substituent, especially an oxy- or oxo-containing substituent, at $C_{17}$ may be used [the term oxy-containing including, of course, both free hydroxy and etherified hydroxy (e. g., alkoxy)]. Thus, among the $C_{17}$-substituted steroids utilizable in the process of the invention are: progesterone; testosterone; Reichstein's Compound "S"; estriol; estradiol; testosterone fatty acid esters (e. g., acetate, propionate, enanthate); Reichstein's Compound "S" fatty acid esters (e. g., acetate, propionate, butyrate, etc.); diosgenin; diosgenin acetate; $\Delta^4$-tigogenone; $\Delta^4$-becogenone; $\Delta^{1,4}$-androstadiene-17-ol-3-one; $\Delta^5$-androstenediol-1-3, 17; $\Delta^4$-androstenedione-3,17; $\Delta^5$-androstenediol-3,17-3 monoacetate; the 3,20-pregnanediols and allopregnanediols; pregnanedione; 11-dehydroprogesterone; desoxycorticosterone; hydroxyprogesterones, such as the 11α, 11β or 6β hydroxy compounds; ketoprogesterones, such as the 11, 12 or 6 keto compounds; and $\Delta^4$-3-keto etiocholanic acid. Also utilizable are the known dehydro [the term "dehydro" having the accepted meaning "dehydrogenated" and not "dehydrated"] derivatives of the above-mentioned steroids, e. g., those having a C=C linkage in the following positions: 6, 7; 8, 9; 9, 11; 11, 12; 8, 14; or 14, 15).

The sources of nitrogenous, growth-promoting factors are those normally employed in such processes. They may be natural organics (e. g., soybean meal, cornsteep liquor, meat extract and/or distillers solubles) or synthetics such as nitrates and ammonium compounds.

As to the energy-source material, lipids, especially (1) fat acids having at least 14 carbon atoms, (2) fats or (3) mixtures thereof, are preferred. Examples of such fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin; and illustrative fat acids are stearic, palmitic, oleic, linoleic and myristic acids. However, other carbon-containing materials may also be used. Examples of such materials are glycerol, glucose, fructose, sucrose, lactose, maltose, dextrins, starches and whey. These materials may be used either in purified state or as concentrates, such as whey concentrate, cornsteep liquor, or grain mashes (e. g., corn, wheat, or barley mash). Mixtures of the above may, of course, be employed. It is to be noted, however, that the $C_{17}$-substituted steroid is added to the fermentation medium essentially as a precursor, and not as an energy source.

The media used in the process of the invention may contain other precursors in addition to the $C_{17}$-substituted steroids to obtain other valuable products.

The process of the invention may result in various oxidation products. Primarily, the $C_{17}$-substituted steroid is oxidized in the $C_{17}$ position to yield lactone products utilizable as hormones or intermediates therefor.

The following examples are illustrative of the invention, but are not to be construed as a limitation thereof.

EXAMPLE 1

*Preparation of 1-dehydrotestololactone*

(a) *Fermentation.*—A medium of the following composition is prepared: cornsteep liquor solids, 3.0 g.; $NH_4H_2PO_4$, 3.0 g.; $CaCO_3$, 2.5 g.; soybean oil, 2.2 g.; progesterone, 0.5 g.; and distilled water to make 1 liter. The medium is adjusted to pH 7.0±0.1. Then, 100 ml. portions of the medium are distributed in 500 ml. Erlenmeyer flasks, and the flasks plugged with cotton and sterilized in the usual manner (i. e., by autoclaving for 30 minutes at 120° C.). When cool, each of the flasks is inoculated with 5–10% of a vegetative inoculum of *Cylindrocarpon radicola* [the vegetative inoculum being grown from stock cultures (lyophilized vial or agar slant) for 48–72 hours in a medium of the following composition: cornsteep liquor solids, 15 g.; brown sugar, 10 g.; $NaNO_3$, 6 g.; $ZnSO_4$, .001 g.; $KH_2PO_4$, 1.5 g.;

$MgSO_4 \cdot 7H_2O$, 0.5 g.; $CaCO_3$, 5 g.; lard oil, 2 g.; distilled water to make 1 liter]. The flasks are then placed on a reciprocating shaker (120 one and one-half inch cycles per minute) and mechanically shaken at 25° C. for 3 days. The contents of the flasks are then pooled and, after the pH of the culture is adjusted to about 4±0.2 with sulfuric acid, filtered through Seitz filter pads to separate the mycelium from the fermented medium.

(b) *Extraction.*—The culture filtrate (40 liters) obtained in (a) is extracted with chloroform (40 liters) in an extractor (e. g., Podbelniak U. S. Patent 2,530,886, or improvements thereon) and the filtered chloroform extract is evaporated to dryness in vacuo. The residue (11.1 g.) is taken up in 200 ml. of 80% aqueous methanol, and the resulting solution is extracted four times with 100 ml. portions of hexane. The 80% aqueous methanol solution is then concentrated in vacuo until crystals appear; and, after cooling at 0° C. for several (usually about 3–4) hours, the crystals formed are recovered by filtration. About 2.9 g. 1-dehydrotestololactone (M. P. 217–217.5° C.) are thus obtained. Concentration of the mother liquors yields additionally about 6.0 g. of the lactone. Recrystallization from acetone yields a purified 1-dehydrotestololactone having the following properties: M. P.; 218–219° C.; $[\alpha]_D^{23}$, —44° (C=1.20 in chloroform);

U.V.: $\lambda_{max.}^{alc.} = 242$ m$\mu$($\epsilon = 15750$); I.R.: $\lambda_{max.}^{Nujol} = 5.83$ $\mu$ (lactone carbonyl) and 6.01 and 6.15$\mu$ ($\Delta^{1,4}$-3-ketone). Analysis: Calcd. for $C_{19}H_{24}O_3$; C, 75.97; H, 8.05; M. W. 300. Found: C, 76.29; H, 7.87; M. W. (Rast), 315. The compound has the structural formula

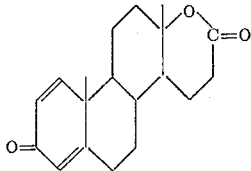

EXAMPLE 2

Preparation of estrololactone

A glass column (1 cm. diameter), filled with glass helices and maintained in a vertical position, is heated by means of an electric furnace and maintained at about 550–600° C. A hot solution of about 750 mg. 1-dehydrotestololactone in about 100 ml. mineral oil is then poured slowly through the column, and the hot effluent is collected in a round-bottom flask. The effluent is cooled, and diluted with about 200 ml. hexane; and the resulting mixture is allowed to remain at 0° C. for about 18 hours. About 496 mg. of crystalline deposit is separated by filtration, then washed with hexane. The dried crystals are then digested with warm acetone, leaving behind about 25 mg. estrololactone which is recovered by filtration.

For characterization, the estrololactone is acetylated by allowing it to remain overnight in contact with about 2 ml. of a mixture of acetic anhydride and pyridine, 1:1. The residue, after removal of the acetylating agents, is taken up in chloroform and washed successively with dilute hydrochloric acid, dilute sodium bicarbonate and water. The resulting chloroform solution is dried over sodium sulfate, and the chloroform is allowed to evaporate in vacuo to yield about 17.3 mg. crude acetate. When this crude material is dissolved in a mixture of benzene (4 ml.) and hexane (8 ml.), chromatographed on 0.5 g. sulfuric acid-washed alumina, and then eluted with benzene-hexane, 1:2, about 15 ml. oily impurities are obtained, followed by about 175 ml. solution containing the crystalline acetate. Further elution with about 50 ml. benzene-hexane (1:2) yields an additional fraction containing the crystalline acetate. The crystalline acetate is separated from the combined eluates by filtration. This crystalline acetate, on recrystallization three times from methanol, yields the pure acetate as prismatic rods mixed with heavy diamond-shaped crystals having a double melting point of 142–4° C. and 148–150° C. and U. V. absorption spectrum maxima characteristic of a phenolic acetate $[\lambda_{max.}^{alc.} = 267$ m$\mu$($\epsilon = 1080$) and $\lambda_{max.}^{alc.} = 275$ m$\mu$($\epsilon = 945$)]

The purified acetate has substantially the same melting point and I. R. spectrum as an authentic sample of estrololacetone acetate [Jacobsen, J. Biol. Chem., 171, 61 (1947)] and a mixed melting point of the two shows no depression.

EXAMPLE 3

Following the procedures of Example 1, but substituting an equivalent amount of testosterone for the progesterone of that example, the same products are obtained. 1-dehydrotestololactone thus produced was found to have the following properties: M. P. 216–218° C.; $[\alpha]_D^{23}$, —45.6° (C=1.24 in chloroform); I. R. spectrum identical with that obtained using authentic 1-dehydrotestololactone; no depression of M. P. when mixed with authentic 1-dehydrotestololactone and the melting point determined.

EXAMPLE 4

Following the procedure of Example 1, but substituting an equivalent amount of Reichstein's Compound "S" for the progesterone of that example, the same products are obtained. 1-dehydrotestololactone thus produced was found to have the following properties: M. P. 216–218° C.; I. R. spectrum identical with that obtained using authentic 1-dehydrotestololactone; no depression of M. P. when mixed with authentic 1-dehydrotestololactone and the mixed melting point determined.

The invention may be variously otherwise embodied within the scope of the appended claim.

I claim:

1-dehydrotestololactone.

References Cited in the file of this patent

UNITED STATES PATENTS

| | | |
|---|---|---|
| 2,480,246 | Jacobson et al. | Aug. 30, 1949 |
| 2,499,248 | Pincus et al. | Feb. 28, 1950 |
| 2,602,769 | Murray et al. | July 8, 1952 |
| 2,658,023 | Shull et al. | Nov. 3, 1953 |

OTHER REFERENCES

Jacobsen et al.: J. Biol. Chem., vol. 171, pp. 71–79 (1948).

Levy et al.: J. Biol. Chem. 171, pp. 71–79 (1947).